United States Patent [19]

Dunbar

[11] 4,358,502

[45] Nov. 9, 1982

[54] GLASS FIBER MAT FOR REINFORCING POLYAMIDES

[75] Inventor: Sidney G. Dunbar, Granville, Ohio

[73] Assignee: Owens-Corning Fiberglas Corporation, Toledo, Ohio

[21] Appl. No.: 330,369

[22] Filed: Dec. 14, 1981

[51] Int. Cl.[3] ............................................. B32B 5/16
[52] U.S. Cl. .................................. 428/283; 65/3.43;
65/3.44; 65/4.4; 156/167; 156/181; 156/314;
156/330; 156/331.7; 428/198; 428/285;
428/287; 428/288; 428/290; 428/297; 428/298;
428/302; 428/303; 428/327; 428/391;
428/423.1; 428/429; 428/447; 523/213;
523/214; 523/466; 524/591
[58] Field of Search .............. 523/213, 214, 217, 466;
524/591; 428/283, 284, 285, 286, 288, 289, 290,
297, 298, 302, 303, 391, 429, 447, 287, 327;
156/62.2, 167, 181, 314, 330, 331.7; 65/3.43,
3.44, 4.4, 9

[56] References Cited

U.S. PATENT DOCUMENTS 4,246,145 1/1981 Mobnier et al. ...................... 65/3.43
4,305,742 12/1981 Barch et al. ........................... 65/3.43

*Primary Examiner*—James J. Bell
*Attorney, Agent, or Firm*—Ronald C. Hudgens; Greg Dziegielewski; James B. Wilkens

[57] ABSTRACT

A mat of randomly disposed multifilament glass strand of indefinite length bonded to each other within a binder consisting essentially of the dried residue of an aqueous dispersion of emulsified polyurethane or epoxy resin having an average particle diameter of at least about 0.6 μm and an amine-functional organosilane, where the individual filaments are sized with a mixture of an amine-functional organosilane and an amide reaction product of a fatty acid with an aliphatic polyamine, the reaction product having residual amine functionality, gives improved impact strength when used to reinforce thermoplastic, and especially polyamide, laminates which are stamped to form shaped articles.

12 Claims, No Drawings

GLASS FIBER MAT FOR REINFORCING POLYAMIDES

TECHNICAL FIELD

This invention relates to the field of glass fiber reinforcement for articles of organic resins and polymers. More particularly, it relates to the field of such reinforcement by the use of mats of multifilament glass strands of indeterminate length randomly disposed and bonded to each other, and to the preparation of such mats.

BACKGROUND OF THE INVENTION

Mats of multifilament glass strands of indeterminate length randomly disposed and bonded to each other which have heretofore been used as reinforcement for organic resins and polymers have been characterized by the use as binders of a combination of emulsified polymer or resin and powdered solid polymer or resin. The present invention comprehends the discovery that in using mats of this type for reinforcing thermoplastic resins and polymers, and especially polyamides, as stampable laminates, it is advantageous to use a binder which material omits the powdered solid as a component of the mat binder and also to use a particular composition for sizing the individual glass filaments making up the strands of which the mat is formed.

SUMMARY OF THE INVENTION

One aspect of this invention is a bonded mat of randomly disposed, multifilament glass strands of indeterminate length especially adapted for use as reinforcement in stampable laminates of polyamide resin, where the individual glass filaments of said strands are sized with a mixture of an amine-functional organosilane and an amide reaction product of a fatty acid with an aliphatic polyamine, said reaction product having residual amine functionality, and where said strands are bonded to each other with a binder consisting essentially of the dried residue of an aqueous dispersion of emulsified polyurethane or epoxy resin having average particle size of at least about 0.6 μm and an amine-functional organosilane.

Another aspect of this invention is a method of making a bonded mat of glass strands of indeterminate length, said mat being especially adapted for use as reinforcement in stampable laminates of polyamide resin, which comprises continuously drawing a plurality of glass filaments from a body of molten glass as it emerges through a corresponding plurality of orifices in a suitable bushing forming a portion of a reservoir for said body of molten glass; applying to the surfaces of said filaments as they are being so drawn an aqueous sizing composition comprising an amine-functional organosilane and an amide reaction product of a fatty acid and an aliphatic polyamine, said reaction product having residual amine functionality; gathering said glass filaments into one or more multifilament strands of indeterminate lengths; disposing said strand substantially randomly onto a suitable support to form a web therefrom; impregnating said web with a liquid binder composition consisting essentially of amine-functional organosilane and emulsified polyurethane or epoxy resin having average particle size of at least about 0.6 μm dispersed in aqueous medium; removing any undesired excess of the liquid binder composition from the impregnated web; and then heating the impregnated web to remove volatile components therefrom and to enhance the adhesion of the dried residue of said binder composition to said strands for bonding said strands to each other.

Still further aspects of this invention are thermoplastic, and particularly a polyamide, stampable laminates reinforced with such a mat, and stamped articles made therefrom.

DETAILED DESCRIPTION OF THE INVENTION

The glass filaments can be drawn from molten glass emerging from a reservoir through orifices in a bushing, coated with the sizing composition and gathered into multifilament strands, using any suitable and conventional techniques. Thus, the strands and their constituent individual filaments can be pulled by wrapping the strand about a wheel rotating at appropriate speed, thereby tensioning the filaments so as to attenuate them to the desired diameter while they are still molten as they are drawn from the bushing. The sizing composition can be applied to the solidified filaments as a liquid dispersion and/or solution of the components it is desired to deposit as the size coating, preferably in aqueous medium, by drawing the filaments over a roll or pad wet with the liquid sizing composition, or through a curtain of the liquid sizing composition or by spraying the filaments with the liquid sizing composition. The desired number of individual filaments so coated can then be gathered into multifilament strands by passing them through appropriately disposed combs, notches, shoes, grooved rolls, etc., as they approach the pull wheel or other suitable device for drawing and advancing the strand and its precursor filaments.

For the purposes of the present invention, it is found that the most satisfactory properties, especially impact strength, can be achieved in the final mat-reinforced thermoplastic stamped articles when individually less filaments of about 0.0007 to about 0.0009, and especially of about 0.0008, inch are employed in strands containing about 30 to about 50 individual filaments, although both larger and smaller filaments and strands can be employed and are comprehended by the present invention, in conjunction with the sizing and binder compositions of the present invention.

The liquid sizing composition employed in making the mat of this invention comprises an aqueous dispersion and/or solution of an amine-functional organosilane and an amide reaction product of a fatty acid and an aliphatic polyamine. Both of these components may, if desired, be solubilized and/or stabilized in dispersion by acidification with a suitable acid, such as acetic acid. Suitable silanes, such as gamma-aminopropyltriethoxy silane, are well known and readily available. Suitable polyamine amides, such as reaction products of polyalkylene polyamines with fatty acids, particularly those having about 8 to 10 carbon atoms, are also well known and readily available.

One particularly suitable liquid sizing composition is as follows:

| Ingredient | Wt. Parts |
|---|---|
| A1100 amino silane (Union Carbide) | 0.50 |
| Cirrasol 185 AE polyamine amide (ICI) | 0.020 |
| Cirrasol 185 AN polyamine amide (ICI) | 0.008 |
| Glacial acetic acid | 1.00 |

| Ingredient | Wt. Parts |
| --- | --- |
| Water | 98.5 |

Another particularly suitable liquid sizing composition is as follows:

| Ingredient | Wt. Parts |
| --- | --- |
| A1100 | 0.50 |
| Cirrasol 185 AE | 0.020 |
| Cirrasol 185 AN | 0.008 |
| Water | 99.5 |

The pH of these liquid sizing compositions should be about 8 to 10. They should be clear as mixed and should be used within about 72 hours of preparation.

The essentially continuous strands can then be deposited by any suitable and conventional means onto a suitable substrate, optionally with the concomitant deposition of a minor amount of short chopped multifilament glass strand, to form a web of randomly disposed multifilament glass strands of indeterminate length. It is most convenient, and correspondingly preferred, that the essentially continuous strands be directly deposited into the web, i.e., in-line, without intermediate collection and storage, although the latter alternative may be selected in some circumstances and is comprehended by the present invention.

One suitable method for depositing the essentially continuous strand to form the web is to traverse one or more pull wheels back and forth across the width of an advancing belt or screen as substrate while allowing the strand or strands emanating therefrom to drop onto the belt or screen in a randomly curled and overlapping disposition.

The web can be impregnated with a suitable liquid binder composition by any suitable and conventional means, such as by flooding and draining, spraying, roll or curtain coating, etc. Under typical circumstances, conventional flooding and draining, employing an appropriately porous substrate, has been found convenient and preferable. Heretofore, it has been thought desirable to employ powdered resin or polymer, either as a dispersed additional component in the liquid binder composition or separately deposited into the web, as part of the bonding composition. For the purposes of this invention, it has now been found that such powdered material can be omitted and it is preferred to omit the same.

The liquid binder composition employed in making the mat of this invention consists essentially of an amine-functional organosilane and emulsified polyurethane or epoxy resin having average particle diameter of at least about 0.6 μm in an aqueous medium. Neither the relative proportions of the silane and the emulsified resin nor the total proportion of non-volatile components is narrowly critical and both can vary over wide ranges.

For purposes of the present invention, emulsified polyurethane resins, and more particularly aliphatic polyurethanes, are usually found to be especially advantageous and are correspondingly preferred.

One particularly suitable liquid binder composition is as follows:

| Ingredient | Wt. Parts |
| --- | --- |
| A1100 aminosilane (Union Carbide) | 0.25 |
| 1042H aliphatic polyurethane 1.5 μm emulsion (Wyandotte) | 8.00 |
| Water | 91.75 |

This liquid binder composition should have a pH of about 7 to 9. It should be clear as mixed and should be used within about 72 hours of preparation.

After the web has been impregnated with liquid binder composition, any undesired excess of such liquid binder can be removed by any suitable and conventional means, such as by applying suction to the impregnated web through a suitably porous substrate, by passing the impregnated web through a suitably adjusted gap between opposed rolls, etc. The wet impregnated web can then be heated to remove volatile components, i.e., water, and to enhance the adhesion of the dried residue of the binder composition to the strands for bonding the strands to each other as the bonded mat of this invention. The conditions of heating and drying are not narrowly critical and can, in fact, vary quite broadly, but typically in oven temperature of from about 300° to about 400° F. and a residence time at of about 30 to about 90 seconds will be found satisfactory.

The bonded mat of the invention finds particular utility as reinforcement in stampable thermoplastic laminates, and especially those in which the thermoplastic polymer or resin is a polyamide.

Such laminates can be fabricated from mats of this invention in any suitable and conventional manner, such as by laminating alternate layers of thermoplastic film and bonded mat of this invention, ordinarily with thermoplastic film layers on both exposed surfaces thereof. Other suitable methods would include applying fluid, e.g., molten, thermoplastic material to one or both surfaces of one or more mats of this invention and laminating them with or without the incorporation of additional layers of uncoated mat of this invention.

When such laminates are subsequently stamped using any suitable and conventional die to form a shaped reinforced thermoplastic article, it is found that mat of the present invention bestows a number of advantages and enhanced physical properties such as impact strength, especially when the thermoplastic involved is a polyamide, as compared to mats heretofore known.

Numerous modifications and variations of the invention as particularly described herein will be apparent to those skilled in the art and the same are intended to be comprehended within the scope of this invention.

I claim:

1. A bonded mat of randomly disposed, multifilament glass strands of indeterminate length especially adapted for use as reinforcement in stampable laminates of polyamide resin, where the individual glass filaments of said strands are sized with a mixture of an amine-functional organosilane and an amide reaction product of a fatty acid with an aliphatic polyamine, said reaction product having residual amine functionality, and where said strands are bonded to each other with a binder consisting essentially of the dried residue of an aqueous dispersion of emulsified polyurethane or epoxy resin having average particle size of at least about 0.6 μm and an amine-functional organosilane.

2. A bonded mat according to claim 1 wherein the binder resin is a polyurethane.

3. A bonded mat according to claim 2 wherein said polyurethane is aliphatic and thermoplastic.

4. A bonded mat according to claim 1 wherein said individual glass filaments are about 0.0007 to about 0.0009 inch in average diameter and said strands each contain about 30 to about 50 of said individual glass filaments.

5. A bonded mat according to claim 1 wherein said binder is present in an amount from about 2 to about 4 percent of the weight of the glass strand in said mat.

6. A method of making a bonded mat of glass strands of indeterminate length, said mat being especially adapted for use as reinforcement in stampable laminates of polyamide resin, which comprises:
- a. continuously drawing a plurality of glass filaments from a body of molten glass as it emerges through a corresponding plurality of orifices in a suitable bushing forming a portion of a reservoir for said body of molten glass;
- b. applying the surfaces of said filaments as they are being so drawn on aqueous sizing composition comprising an amine-functional organosilane and an amide reaction product of a fatty acid and an aliphatic polyamine, said reaction product having residual amine functionality;
- c. gathering said glass filaments into one or more multifilament strands of indeterminate lengths;
- d. disposing a said strand substantially randomly onto a suitable support to form a web therefrom;
- e. impregnating said web with a binder composition consisting essentially of amine-functional organosilane and emulsified polyurethane or epoxy resin having average particle size of at least about 0.6 μm dispersed in aqueous medium;
- f. removing any undesired excess of the liquid binder composition from the impregnated web; and
- g. then heating the impregnated web to remove volatile components therefrom and to enhance the adhesion of the dried residue of said binder composition to said strands for bonding said strands to each other.

7. A method according to claim 6 wherein said resin is a polyurethane.

8. A method according to claim 7 wherein said polyurethane is aliphatic and thermoplastic.

9. A method according to claim 6 wherein the individual glass filaments are about 0.0007 to about 0.0009 inch in average diameter and said strands each contain about 30 to about 50 of said individual glass filaments.

10. A method according to claim 6 wherein the amount of said dried residue of said binder composition is form about 2 to about 4 percent of the weight of the glass strand in said mat.

11. A stampable laminate of a mat according to claim 1 and a thermoplastic polymer.

12. A stampable laminate according to claim 11 wherein said thermoplastic polymer is a polyamide.

* * * * *